(12) United States Patent
Lake et al.

(10) Patent No.: US 10,545,039 B2
(45) Date of Patent: Jan. 28, 2020

(54) ENVIRONMENT SENSOR MOUNTING ASSEMBLY

(71) Applicant: ENLIGHTED INC., Sunnyvale, CA (US)

(72) Inventors: Jon Lake, Sunnyvale, MD (US); Christopher Glover, Kensington, MD (US); Vladimir Kovalevsky, San Francisco, CA (US); Richard P. Sillman, Los Altos, CA (US)

(73) Assignee: Enlighted, Inc., Sunnyvale, CA (US)

( * ) Notice: Subject to any disclaimer, the term of this patent is extended or adjusted under 35 U.S.C. 154(b) by 334 days.

(21) Appl. No.: 15/415,795

(22) Filed: Jan. 25, 2017

(65) Prior Publication Data

US 2018/0209826 A1 Jul. 26, 2018

(51) Int. Cl.
*G01D 11/30* (2006.01)

(52) U.S. Cl.
CPC .................... *G01D 11/30* (2013.01)

(58) Field of Classification Search
CPC .... G01D 11/30; G01D 11/245; G21C 17/017; H02G 3/281; H01R 25/14; E04B 9/064
USPC .......................................... 73/866.5; 174/491
See application file for complete search history.

(56) References Cited

U.S. PATENT DOCUMENTS

| | | | | |
|---|---|---|---|---|
| 6,490,939 B1* | 12/2002 | Sargent | .................... | G01B 3/22 73/866.5 |
| 6,742,402 B1* | 6/2004 | Volz | ....................... | B62D 15/02 73/862.192 |
| 9,430,925 B2* | 8/2016 | Mittleman | ........... | G08B 17/107 |
| 10,041,919 B1* | 8/2018 | Wood | ..................... | G08B 21/14 |
| 2003/0200812 A1* | 10/2003 | Kuhn | .................. | A61M 1/3639 73/715 |
| 2005/0230581 A1* | 10/2005 | Gau | ...................... | B60R 19/483 248/229.1 |
| 2007/0017506 A1* | 1/2007 | Bell | ..................... | A61M 15/009 128/200.23 |
| 2007/0186618 A1* | 8/2007 | Ackerman | ............. | B65D 83/20 73/1.06 |
| 2009/0314081 A1* | 12/2009 | Christoph | ............ | G01D 11/245 73/431 |
| 2011/0319009 A1* | 12/2011 | Nam | ..................... | F24F 1/0007 454/256 |
| 2013/0207528 A1* | 8/2013 | Carberry | ............ | H05B 37/0227 312/237 |
| 2013/0319752 A1* | 12/2013 | Cowles | .................... | H02G 3/20 174/491 |
| 2015/0030375 A1* | 1/2015 | Kawaguchi | ............ | G01D 11/30 403/19 |
| 2015/0139271 A1* | 5/2015 | Lee | ...................... | B60R 13/025 374/121 |

(Continued)

*Primary Examiner* — John Fitzgerald
*Assistant Examiner* — Truong D Phan

(57) ABSTRACT

A sensor mounting assembly for installing an environment sensor in a drop-down ceiling or light fixture of a building. The sensor mounting assembly includes a cylindrically-shaped carrier and a locking nut adapted to removably engage the carrier, and to clamp onto the mounting substrate. The carrier further is configured to receive the environment sensor from the front. The carrier and sensor include interlocking features to removably lock the sensor. Both installation and removal of the sensor may be performed from the front of the mounting substrate. Method and kits for mounting the sensor are described.

19 Claims, 7 Drawing Sheets

(56) References Cited

U.S. PATENT DOCUMENTS

| | | | |
|---|---|---|---|
| 2015/0268334 A1* | 9/2015 | Wehling | G01S 15/931 |
| | | | 310/334 |
| 2016/0071386 A1* | 3/2016 | Mittleman | G08B 17/113 |
| | | | 340/628 |
| 2016/0265965 A1* | 9/2016 | Miura | G01J 1/4228 |
| 2016/0331284 A1* | 11/2016 | Pace | A61B 5/14503 |
| 2017/0228993 A1* | 8/2017 | Avak | G01C 21/206 |
| 2018/0122351 A1* | 5/2018 | Simonton | G10K 11/006 |
| 2018/0259373 A1* | 9/2018 | Staton | G01D 11/30 |
| 2018/0322753 A1* | 11/2018 | Stibich | G08B 17/10 |

\* cited by examiner

ENVIRONMENT SENSOR MOUNTING ASSEMBLY

CROSS-REFERENCE TO RELATED APPLICATIONS

None.

BACKGROUND OF THE INVENTION

The invention relates to environment sensors, and more particularly, to assemblies for mounting the environment sensor to a substrate in a building.

There is a growing demand for environment sensors to manage the environment and energy consumption in buildings. Several classes of environment sensors serve this need including ambient light sensors, temperature sensors, power meters, motion sensors, and infrared sensors.

Environment sensors, such as infrared sensors, are often anchored to various types of mounting substrates including light fixture enclosures or ceiling tiles of a drop-down ceiling in a building. Light fixture enclosures are made of thin rigid materials (e.g., sheet metal, plastic) having a thickness of approximately 0.5-5 mm. In contrast, ceiling tiles are made of relatively thick, soft, low density materials (e.g., compressed fiber, fiberglass) having a thickness of approximately 10-40 mm.

Because of the variation in material properties of the sensor mounting substrates described above, it is difficult to securely and conveniently remove and install one type of sensor in a wide variety of types of mounting substrates, and what is more, to do so such that the visible end of the sensor does not excessively protrude or stand proud from the substrate surface. It is also challenging to do so without damaging the substrate during the replacement operation.

There are a number of commercially available sensor assemblies that address some but not all of the above challenges. For example, FIG. 1 shows a figure of one type of known presence sensor 10 (see model no. talis MFM360-6-1, manufactured by Grasslin Gmbh, St. Georgen, Germany). The sensor 10 is intended to be inserted into an opening in a drop-down ceiling. The sensor 10 includes a set of springs 12 which automatically unfold after being inserted into the opening in the ceiling. The spring arms 12 operate with the lip 14 to hold the sensor in the drop-down ceiling. The springs, however, can undesirably allow for some slip or rattle relative to the hole depending on the thickness of the substrate and the mechanical spring constant of the arms (spring force depends linearly with deflection). The spring force may damage the soft tile substrates. Additionally, the sensor 10 is not easy to replace from the front of the ceiling because the springs 12 continuously urge the sensor rearward into the ceiling substrate. Additionally, the sensor 10 usually has an integrated cable 16 which must be disconnected from a remote power box in the plenum (i.e., the empty space between the actual ceiling and the drop-down ceiling). Consequently, the technician must access the plenum in order to replace the presence sensor 10. This is undesirable.

Accordingly, an improved apparatus that overcomes the challenges described above is desired. An improved apparatus is desired that allows for easy replacement of a sensor from the front of the drop-down ceiling, that can be removed and installed in multiple types of ceiling substrates, that has a firm and secure locked configuration, that does not have slip relative to the hole, that does not require tools nor a qualified electrician, and that does not damage the mounting substrate during installation and removal of the sensor.

SUMMARY OF THE INVENTION

An environment sensor assembly for mounting the sensor to a drop down ceiling or light fixture in a building.

In embodiments, a sensor mounting assembly has a cylindrical shaped carrier, and a locking nut adapted to reversibly engage the carrier and to clamp onto the mounting substrate. The environment sensor is receivable by the carrier from the front.

In embodiments, the carrier component provides a mechanical interface for engaging the sensor when the sensor is inserted into the mounting assembly. The mechanical interface may include a latch that engages a mating feature in the sensor when the sensor is inserted into the carrier component.

In embodiments, an environment sensor assembly for anchoring an environment sensor to a mounting substrate of a building includes a carrier component comprising a proximal end, a distal end, a body defining a tubular-shaped cavity adapted to removably receive the sensor, and a flange radially extending from the proximal end of the carrier component. The sensor assembly also includes a locking component comprising a circular opening. The locking component and carrier component have interlocking elements adapted to operate together such that the carrier component can be advanced through the opening of the locking component and releasably secured to the locking member.

Additionally, in embodiments, the carrier component has an inwardly directed grip structure that releasably engages a mating structure on an exterior surface of the sensor when the sensor is inserted into the carrier component.

The interlocking elements may vary widely. In embodiments, the interlocking components include teeth or thread-like structures.

In embodiments, an environment sensor mount kit for anchoring an environment sensor to a plurality of different types of mounting substrates includes a plurality of different carrier assemblies. The kit includes at least a first type of carrier assembly adapted to mount to a first mounting substrate. The kit includes at least a second type of carrier assembly adapted to mount to a second mounting substrate different than the first mounting substrate.

The first and second carrier assemblies are also adapted to releasably or reversibly receive one sensor body type. Using the kit, one sensor body type may be inserted into a plurality of different mounting substrates, by hand, and from the front of the mounting substrate.

In embodiments, the environment sensor mount kit further includes instructions for use to install the first carrier assembly to a light fixture. In embodiments, the instructions for use further include instructions for installing the second carrier assembly to a ceiling tile. The environment sensor mount kit may comprise at least one sensor.

In embodiments, a method for installing an environment sensor assembly in a mounting substrate of a building comprises the steps of creating a hole through the mounting substrate; and advancing a carrier component through the hole such that a distal section of the carrier component protrudes from the rear of the mounting substrate. A locking component is manipulated onto the distal section of the carrier component wherein interlocking elements of the locking component and carrier component are engaged to cause opposing surfaces of the carrier component and locking component to clamp the front and rear of the mounting substrate.

After the carrier assembly is secured to the mounting substrate, the method includes advancing a first sensor into a cavity of the carrier component from the front of the mounting substrate until the first sensor fastens to the carrier component.

In embodiments, the method further includes removing the first sensor from the front of the mounting substrate.

In embodiments, the method further includes advancing a second sensor into the carrier component from the front of the mounting substrate.

In embodiments, the advancing and removing steps are performed toollessly and by hand.

In embodiments, the step of engaging interlocking elements comprises urging the locking component downward along the carrier component towards the rear surface of the mounting substrate, and over the interlocking elements.

In embodiments, the step engaging the interlocking elements includes applying a ratchet member across a set of teeth.

In embodiments, the mounting substrate is one type selected from the group of a ceiling tile and a light fixture housing.

In embodiments, the method further comprises the step of mitigating lateral movement of the carrier component and locking component relative to the hole. The step of mitigating lateral movement can be performed by providing on the locking component one or more downwardly extending resilient tabs.

In embodiments, installation, removal, and replacement of the sensors are performed from the front of the mounting substrate, by hand, without tools, and without damaging the tile substrate or light fixture.

In embodiments, the environment sensor may be selected from the group consisting of ambient light sensors, temperature sensors, power meters, motion sensors, and infrared sensors.

Still other descriptions, objects and advantages of the present invention will become apparent from the detailed description to follow, together with the accompanying drawings.

DETAILED DESCRIPTION OF THE INVENTION

Figure 1:
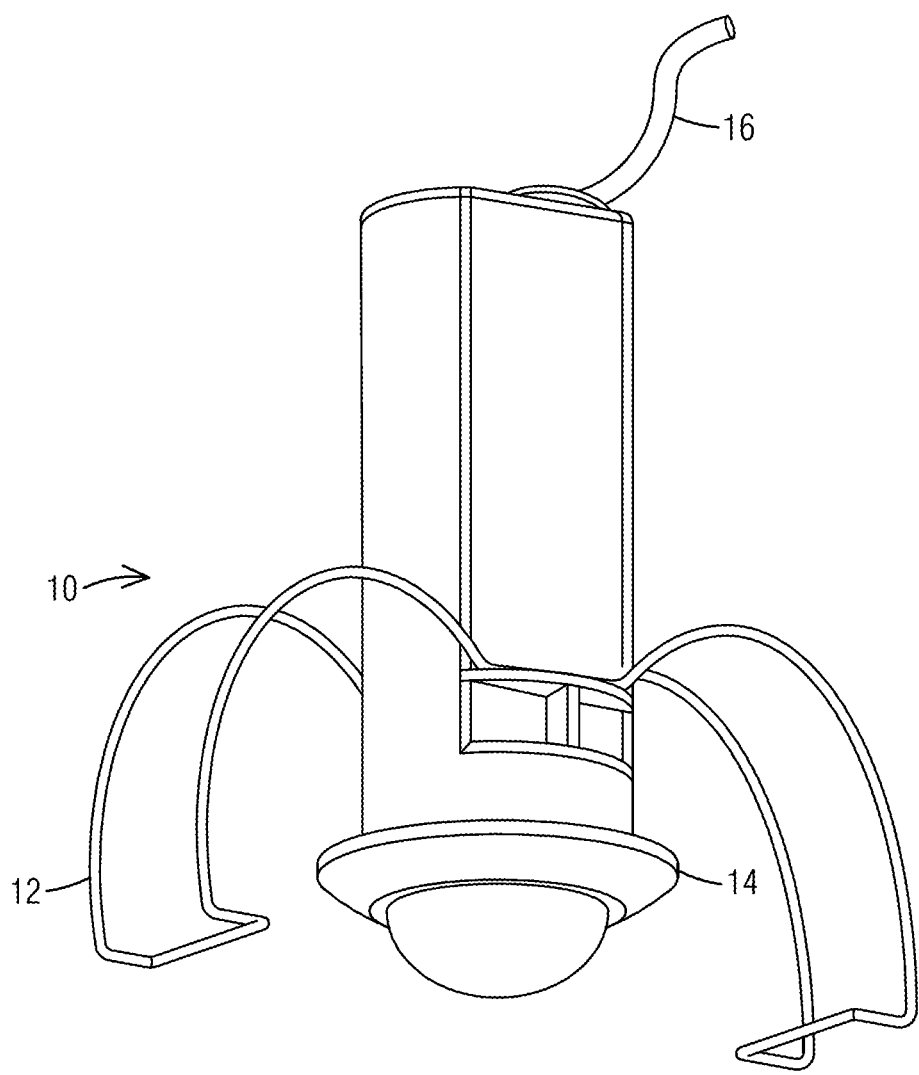
FIG. 1 depicts a prior art presence sensor.

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Embodiments of the invention include various sensor mounting assemblies for releasably or reversibly anchoring the sensor in a drop-down ceiling or light fixture of a building. In embodiments the sensor mounting assemblies allow a technician to insert, remove, and replace the sensor from the front surface of the ceiling, by hand, and without tools.

In embodiments, the sensor mounting assemblies are operable with different types of mounting substrates including thick mounting substrates and thin mounting substrates. Examples of thick material substrates include ceiling tiles. Examples of thin, more rigid, substrates include the housing of a light fixture.

The sensor mounting assemblies described herein accommodate variations in thickness, diameter, and rigidity of the substrate material. Accordingly, embodiments of the invention make it possible for one type of sensor to be conveniently anchored to different types of mounting substrates throughout a building.

Figure 2A:
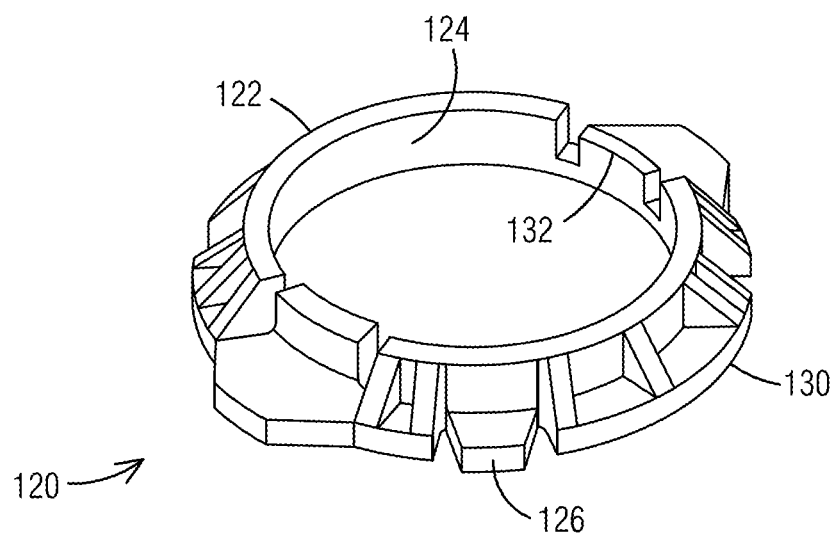
FIGS. 2A, 2B are perspective views of components of a sensor mounting assembly in accordance with an embodiment of the invention.
Figure 2B:
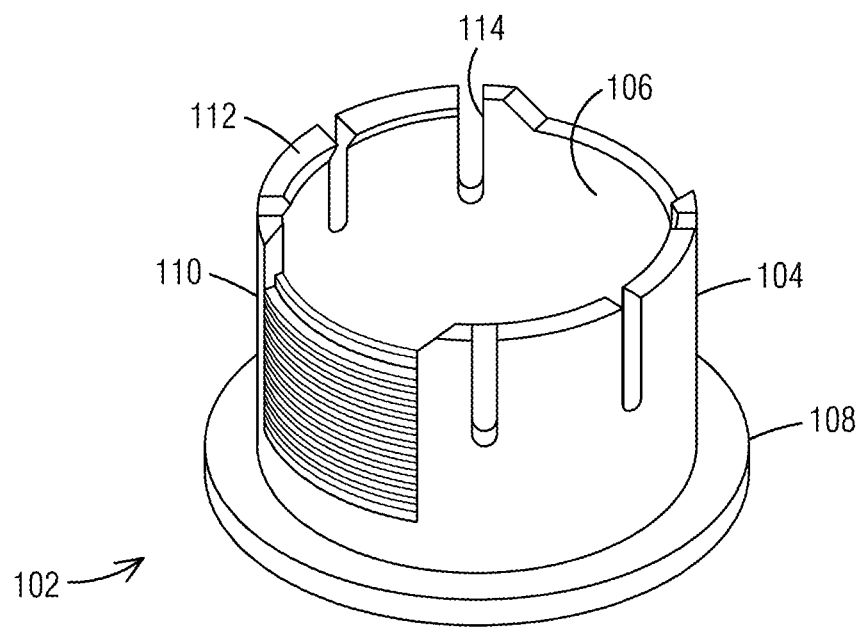

FIGS. 2A, 2B are perspective views of components of a sensor mounting assembly in accordance with an embodiment of the invention. As discussed further herein, the embodiment shown in FIGS. 2A, 2B is well suited for, but not limited to, thin hard mounting substrates (e.g., metal substrates having thickness' less than 5 mm).

The sensor mounting assembly is shown having a carrier component 102 and a locking component 120. The carrier component is shown having a cylindrically shaped body 104 defining a cavity 106. As discussed further herein cavity is adapted to receive and lock an environment sensor. The carrier component 102 is also shown having flange 108 radially extending from its proximal end.

Carrier component 102 is shown having a discrete region 110 of protruding elements for interlocking with the locking member 120. The protruding elements of the ratcheting mechanism may vary widely. In the embodiment shown in FIGS. 2A, 2B, the protruding elements are teeth shaped.

Carrier component 102 is also shown having a grip structure 112 to engage the sensor when the sensor is inserted into the cavity of the carrier component. The grip structure may vary widely. In the embodiment shown in FIGS. 2A, 2B, the grip structure 112 has resilient or flexing arms defined by gaps 114.

FIG. 2A shows locking component 120 of the sensor mounting assembly. The locking component is shown having a ring-shaped body 122 defining a circular opening 124. Flexible tab members 126 radially extend from the body 122. As discussed further herein, tab members 126 are resilient and serve to apply force to the rearward side of the mounting substrate. The tab members serve to limit rattling (sometimes referred to as "slop") relative to the loose tolerance of the circular opening in the mounting substrate, discussed further herein.

The locking member 120 is also shown having a counter-lock element 132 which can engage with the interlocking elements 110 of the carrier component.

Figure 3A:
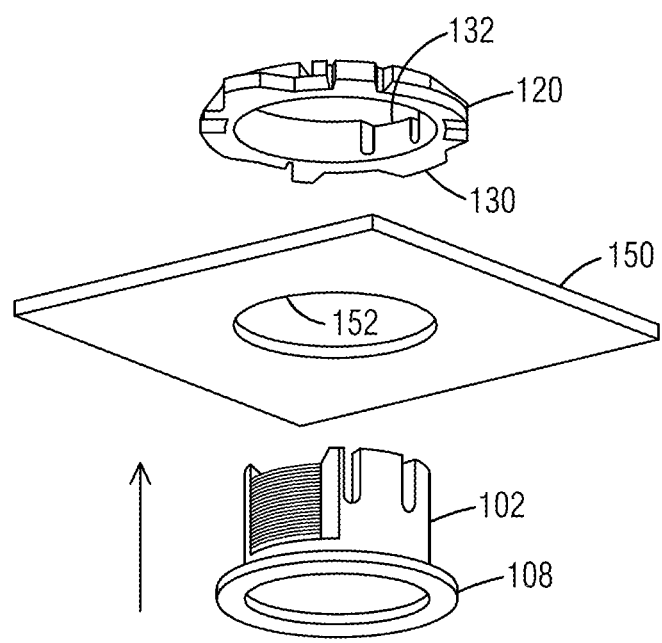
FIGS. 3A, 3B are perspective views of the sensor mounting assembly components shown in FIGS. 2A, 2B being installed on a mounting substrate.
Figure 3B:
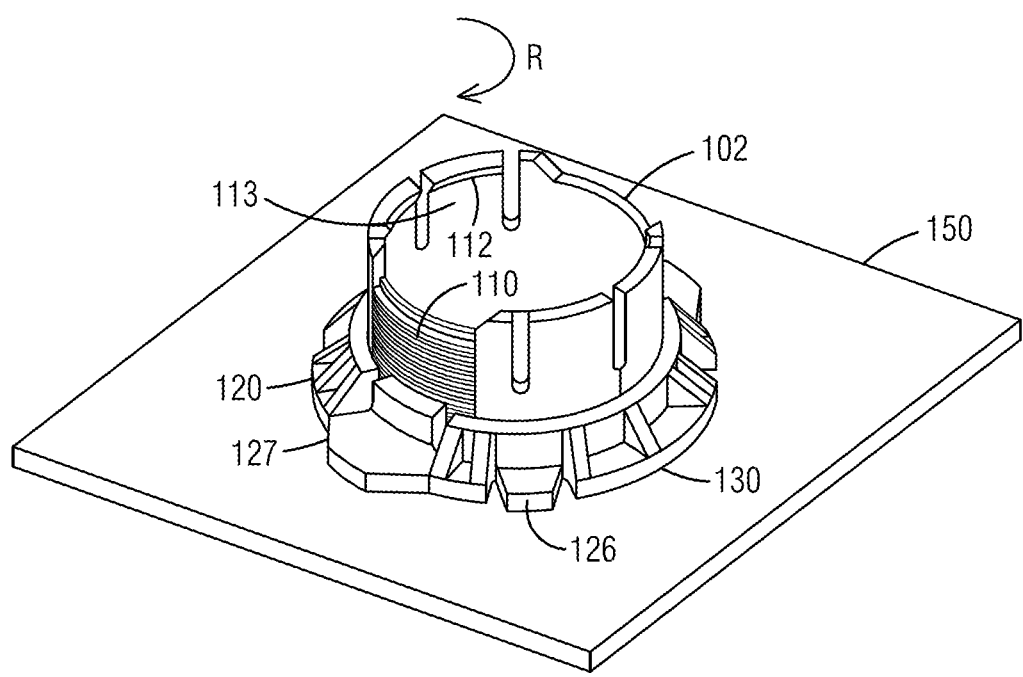

FIGS. 3A, 3B are perspective views of the sensor mounting assembly components 102, 120 shown in FIGS. 2A, 2B being installed on a thin rigid mounting substrate 150. In particular, the carrier component 102 is inserted from the front of the mounting substrate 150 through a pre-drilled or pre-punched hole 152. In embodiments, the hole may take the form of a knock out. A ½" trade size knock out has an actual diameter of ⅞".

Locking member 120 is placed onto the distal end of the carrier component 102 and urged axially along the body 104 of the carrier component until the proximal end 130 and tabs 126 firmly contact the rearward side of the mounting substrate 150.

In embodiments, the locking member 120 is urged downward, over the discrete region 110 of the carrier component. The discrete region (e.g., teeth) 110 and counter-lock element 132 cooperate as a gear rack and ratchet element, respectively, such that the locking component can be urged downward having the ratchet element pass over the gear rack, but prevented from being moved in the opposite direction. The components are only allowed to tighten, not loosen. In a sense, the components are controllably and adjustably tightenable.

The components may be locked in alternative ways. For example, the discrete region 110 of protruding elements and counter-lock element 132 may initially be adjusted to be offset from one another. When in an offset configuration, the locking member can be freely moved axially until the mounting substrate 150 is firmly clamped between flange 108 of the carrier component 102 and the proximal face 130 of the locking component 120. The locking component is then rotated (R) relative to the carrier component to engage counter-lock element 132 with the teeth 110.

The components of the sensor mounting assembly shown in FIG. 3B may also be unlocked without damaging any of the individual structural interlocking elements nor damaging the mounting substrate. To unlock the sensor mounting assembly, the locking member 120 is rotated relative to the carrier component 102 to disengage counter-lock 132 from the locking region 110. Handle tabs 127 simplify removal by providing a better grip when twisting the nut towards non-ratcheted areas of the carrier. In this manner, and unlike a cable tie, the carrier assembly components may be locked and unlocked by rotating the component relative to one another to align or offset interlocking features 110, 132. When the interlocking features are offset, the locking member may be free to move axially. When the interlocking features are aligned as shown in FIG. 3B, the locking member is prohibited from moving upwards or away from the mounting substrate 150.

Figure 4A:
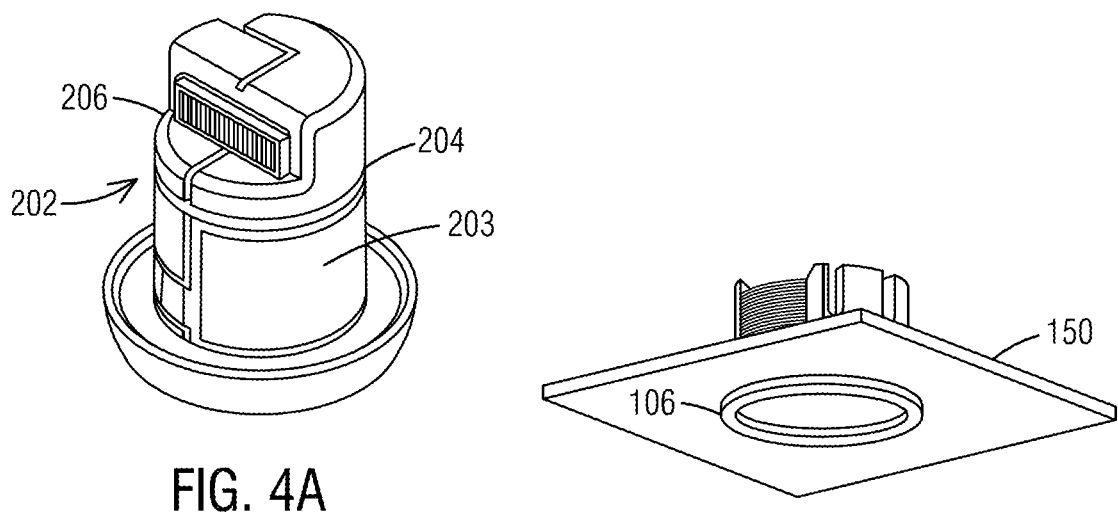
FIG. 4A is a perspective view of a sensor.

FIG. 4A is a perspective view of an exemplary sensor 202 for use with the sensor mounting assembly described in FIGS. 2-3. Sensor includes housing 203, mating feature 204 for receiving the grip structure 112 described above, and a plugin connector 206 to provide power and other electrical communication to the sensor 202. Examples of a plugin connector include, without limitation, a RJ45 and RJ12 connector.

The sensor may house a number of components including, for example, without limitation, an internal or external antenna, lens, flex circuit board and processor. Examples of sensor units and sensors are described in US Patent Publication No. 20160295671; and U.S. Pat. Nos. 8,508,149; 9,304,051; 9,345,115 and 9,474,135. Examples of sensors are the Enlighted Compact Sensor, Enlighted Rugged Sensor, and Enlighted Smart Sensor, each of which is manufactured by Enlighted Inc. (Sunnyvale, Calif.).

Figure 4B:
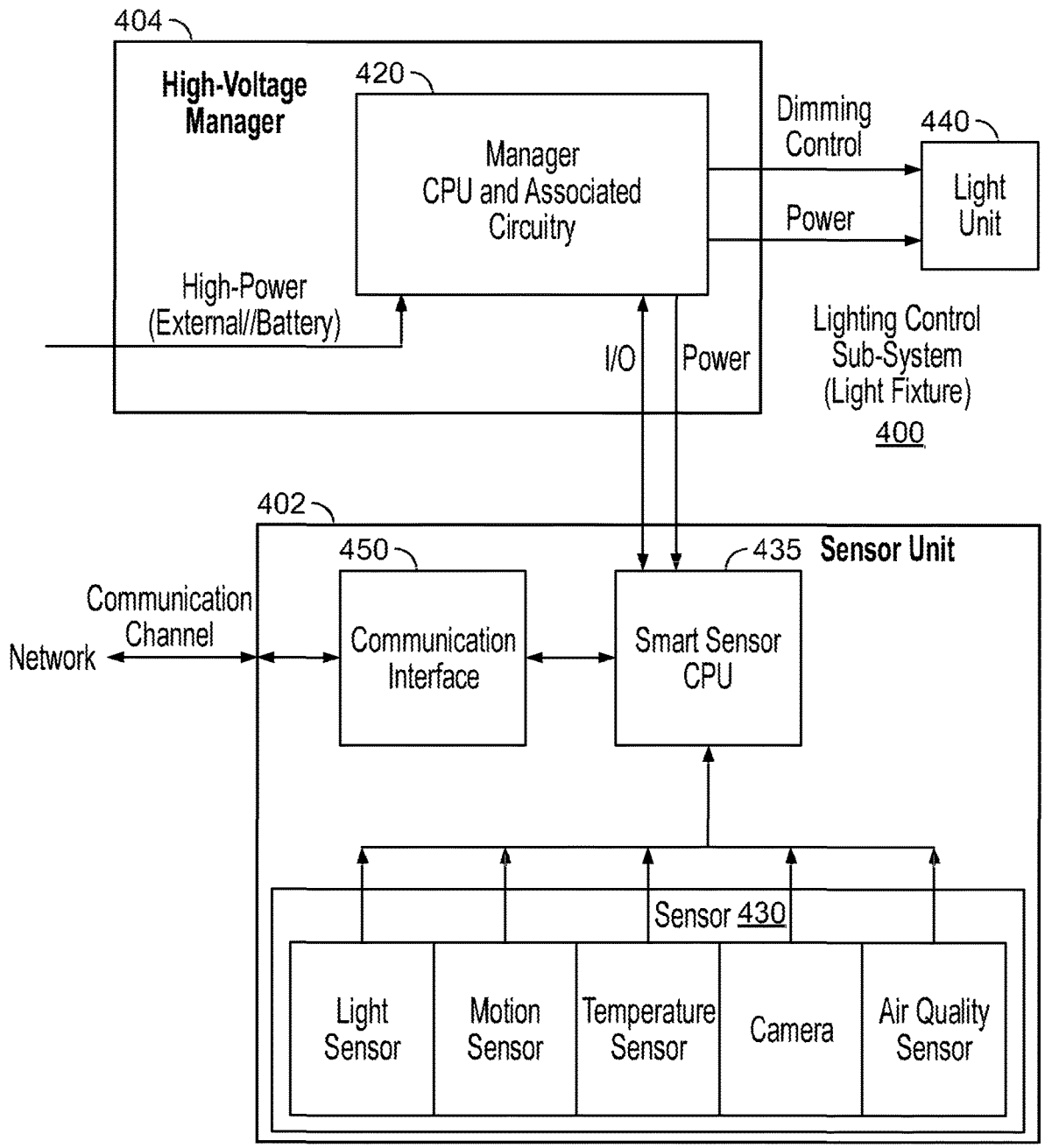
FIG. 4B is a diagram of a lighting control subsystem including a sensor.

With reference to FIG. 4B, a lighting control subsystem 400 is shown including a sensor unit 402 and a light intensity controller 404. The sensor unit 402 is shown having a plurality of sensors 430, a controller 435, and one or more wireless communication units 450.

The plurality of sensors 430 can include, for example, a motion sensor, a light sensor, a temperature sensor, air quality sensor, camera, or any number of other environmental sensors.

The controller 435 is a processor for signal processing of the outputs of the plurality of sensors, and local control of the communication link, and if included, any associated lighting control sub-system 404 described herein. The controller 435 is operative to manage wireless communication circuitry, and generate dimming control based on at least one of the sensed signal and communication from the network.

The light intensity controller 420 shown in FIG. 4B is configured to receive the dimming control and operative to adjust an emitted light intensity of the light fixture 440. Indeed, the components of the sensor unit may vary. Non-limiting examples of sensor units, sensor systems, light fixtures, and sub-systems are described in the US patents and publications listed herein. Additionally, the housing of the sensor, and components of the mounting assembly may be made of various materials. In embodiments, components are made of thermoplastic polymers by injection molding.

Figure 5:
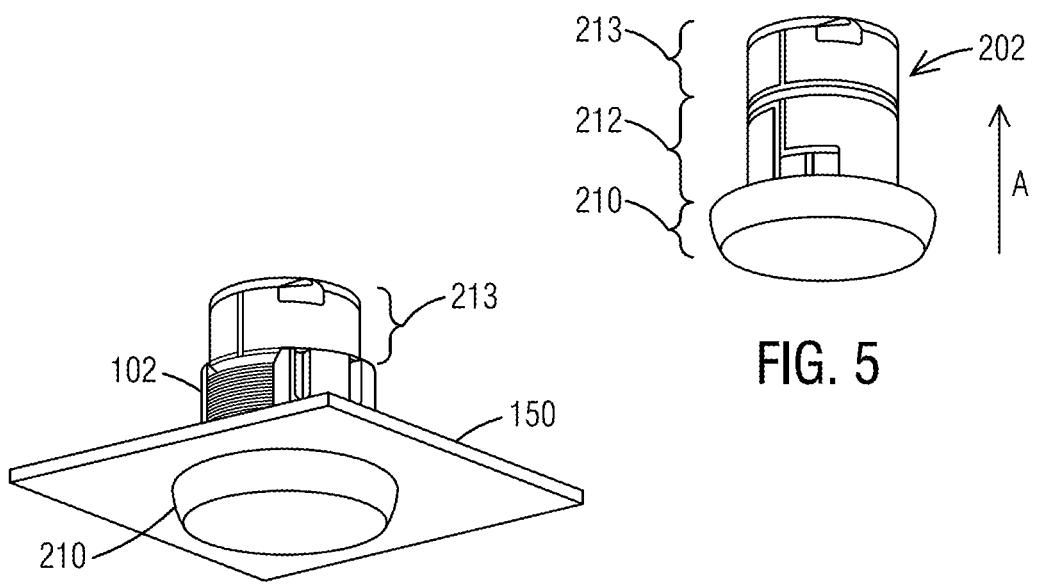
FIGS. 5-7 are perspective views of the sensor shown in FIG. 4A being installed in the sensor mounting assembly shown in FIG. 3B.
Figure 6:
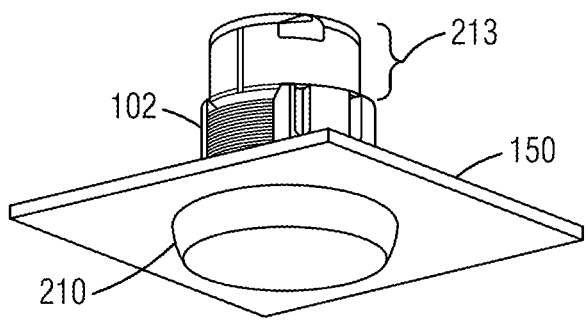
Figure 7:
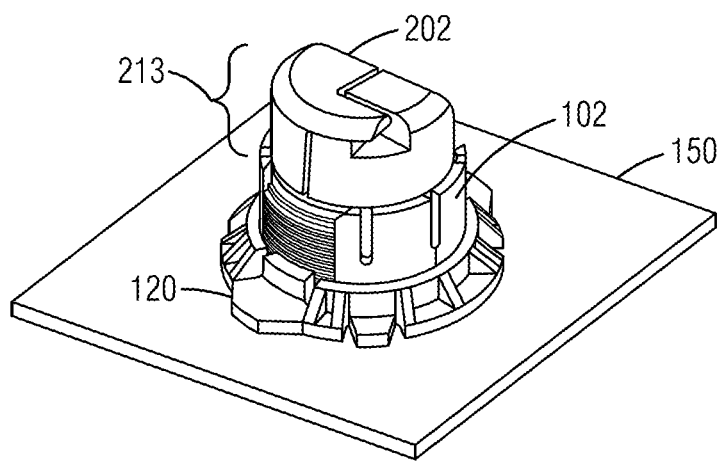

FIGS. 5-7 illustrate the sensor 202 shown in FIG. 4A being installed in the locked mounting assembly shown in FIG. 3B.

FIG. 5 shows sensor 202 being advanced (A) towards the front side of the fixture substrate 150. The sensor 202 is shown advanced into the cavity 106 of the carrier component 102 until a mating element 204 and opposing grip 112 on the carrier component are interlocked. In the embodiment shown in FIGS. 5-7, a grip element 112 is urged by a spring arm 113 to snap fit into groove 204. However, the interlocking cooperation between the sensor and mounting assembly may vary. Opposing interlocking features may include without limitation tongue and groove, ratchet and gear, indent and detent, etc. as well as snap fit, interference fit, and friction fit mechanisms.

As described further herein, the sensor is removable by hand and without tools. In embodiments, the interlocking features are shaped for firm biased engagement, but have the ability to be separated upon sufficient force. In embodiments, the interlocking features have male and female profiles. Exemplary male profiles include a bump, pimple, protrusion, and ramp. Preferably, both profiles have a rounded or smooth edge regions (and in embodiments, a groove with rounded edges and a half cylindrical latch are used) so that after the interlocking features are engaged, a sufficient force in the opposite direction can release the male and female interlocking features. Exemplary heights for the male and female profiles range from 1 to 3 mm.

In embodiments of the present invention, the male and female profiles of the interlocking features are hookless, barbless, and otherwise generally configured such that removal of the sensor from the cavity does not damage the sensor nor sensor carrier. The sensor carrier is multi-use; namely, it may be used multiple times for sensors having the same body configuration/housing. FIG. 6 shows the sensor installed or anchored to the mounting substrate 150. Proximal section 210 is visible from the front. Intermediate section of the sensor 212 is encompassed by the body of the carrier component 102. Distal section 213 of the sensor is shown protruding from the carrier component.

FIG. 7 is a perspective view from the rearward side of the mounting substrate 150.

The sensor may be removed from the carrier, and replaced, from the front side of the substrate by simply pulling the sensor out of the cavity 106 with a force greater than the force of the interlocking grip member and mating feature in the sensor, namely, the groove. In this manner, sensors may be conveniently upgraded, replaced, or removed from the front, without a technician, and by hand without tools. In embodiments, there is no need or requirement to access the rear side of the substrate to remove the sensor.

Additionally, a plugin connector directly incorporated into the sensor accepts power from a cable, eliminating the need to access the assembly and sensor from the rear of the ceiling.

In other embodiments, a plugin connector is indirectly connected to the sensor. For example, a pigtail type cable may extend from the sensor housing and terminate in a plugin connector. The cable with plugin terminal end allows sensors described herein to be removable by hand and without tools. The sensor is pulled from the carrier, and the cable plugin is disconnected from the electrical receptacle. Indeed, there may be many configurations in the spirit of the described embodiments and invention. The invention is only intended to be limited as recited in the appended claims.

Figure 8:
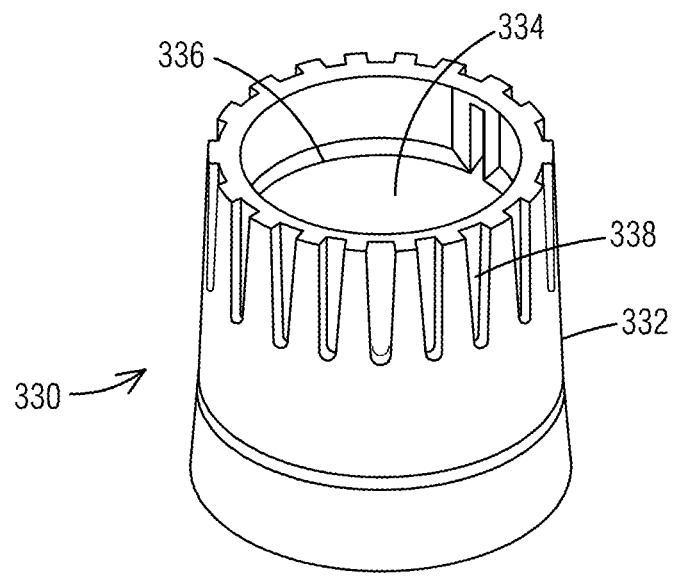
FIGS. 8, 9 are perspective views of components of a sensor mounting assembly in accordance with another embodiment of the invention.
Figure 9:
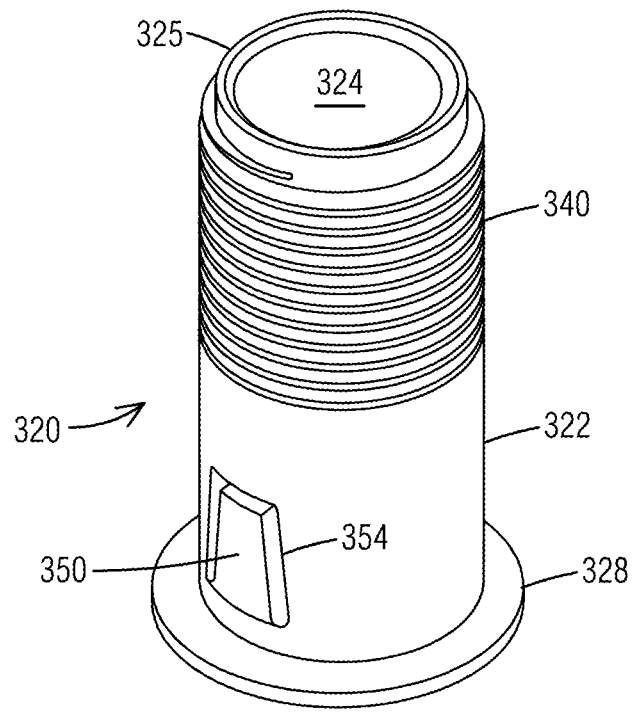

FIGS. 8, 9 are perspective views of components of another sensor mounting assembly well suited for anchoring in relatively thick, or varying sized, soft substrates such as a ceiling tile of a drop-down ceiling in a building. In embodiments, the mounting assembly is operable to anchor a sensor in substrates having a thickness greater than 25 mm, and in embodiments up to approximately 40 mm (1.5 inches) or more.

The sensor mounting assembly includes carrier component 320 and locking component 330. The carrier component 320 is shown having a cylindrically shaped or tubular body 322 defining a bore 324. As discussed herein cavity or bore 324 is adapted to receive an environment sensor. The carrier component 320 is also shown having lip, rim or flange 328 radially extending from its proximal end. Carrier component 320 is shown having a discrete region 340 spanning a portion of the length of the body. The discrete region 340 includes protruding elements for interlocking with the locking member 330. The protruding elements may vary widely. In the embodiment shown in FIGS. 8-9, the protruding elements are a thread mechanism 340.

Carrier component 320 is also shown comprising a grip structure 350 to engage the sensor when the sensor is inserted into the cavity of the carrier component. The grip structure may also vary widely. In the embodiment shown in FIGS. 8-9, the grip structure has resilient or flexing arms defined by gaps 354.

FIG. 8 shows locking component 330 of the sensor mounting assembly. The locking component 330 is shown having a cap-like or nut-shaped body 332 defining a circular opening 334. Finger holds 338 are shown spaced along the exterior of body 332. In embodiments, as shown in FIG. 8, the finger holds 338 are in the form of vertical channels.

The locking member 330 is also shown having a counter-lock element 336 which can engage the interlocking elements 340 of the carrier component. Counter-lock element 336 may be a mating or interlocking thread structure to engage the threads 340 disposed on the exterior of the carrier component.

Figure 10:
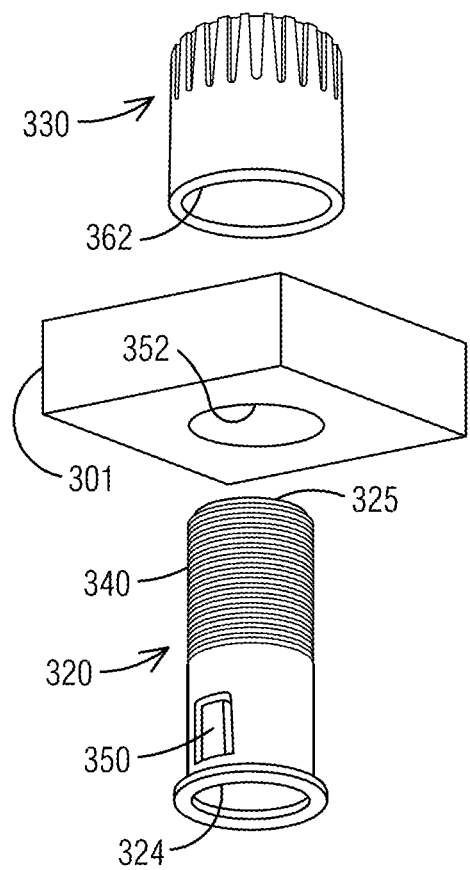
FIGS. 10, 11 are perspective views of the sensor mounting assembly components shown in FIGS. 8, 9 being installed on another mounting substrate.
Figure 11:
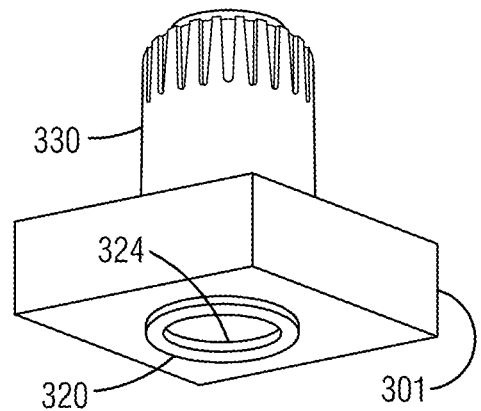

FIGS. 10, 11 are perspective views of the sensor mounting assembly components shown in FIGS. 8, 9 being installed on a relatively thick soft mounting substrate 301 (e.g., ceiling tile). In particular, the carrier component 320 is inserted from the front of the mounting substrate 301 through the pre-drilled circular opening 352.

Locking member 330 is placed onto the distal end 325 of the carrier component 320 until the threads are engaged. The locking member 330 is then rotated relative to the carrier component until the proximal end 362 of the locking member firmly contacts the rearward side of the mounting substrate 301, and the rim 328 of the carrier component 320 firmly contacts the front side of the mounting substrate. In this manner, the mounting substrate is clamped between the opposing surfaces of the sensor mounting components.

FIG. 11 shows the sensor mounting assembly in a locked configuration. To unlock the components, the locking component is unscrewed. In embodiments the lock nut is rotated counterclockwise to unscrew and release the components from one another.

Figure 12:
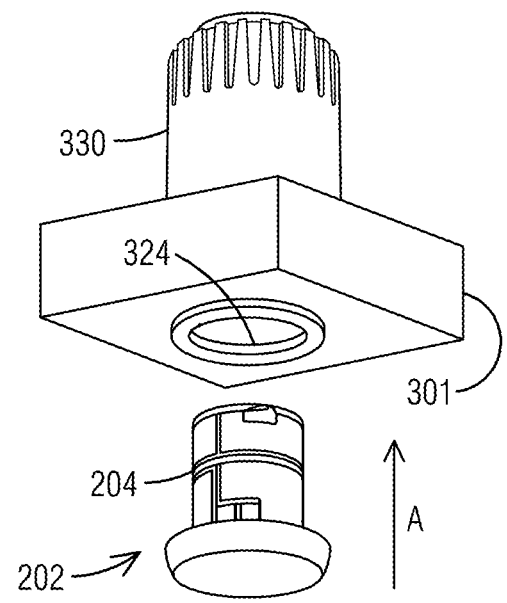
FIGS. 12-13 are perspective views of the sensor shown in FIG. 4A being installed in the sensor mounting assembly shown in FIG. 11.
Figure 13:
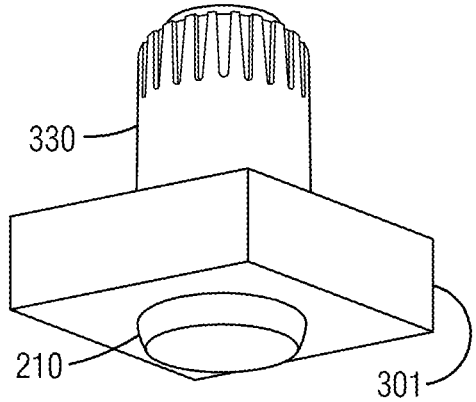

FIGS. 12-13 show sensor 202 from FIG. 4A being advanced in direction (A) towards the front side of the ceiling substrate 301. The sensor 202 is received by the cavity 324 of the carrier component 320 until a mating element 204 and opposing grip 350 on the carrier component are interlocked. In the embodiment shown in FIGS. 12-13, a grip element 350 is urged by a spring arm similar to that described above in connection with FIGS. 5-7. However, the interlocking cooperation between the sensor and mounting assembly may vary widely. Opposing interlocking features may include, without limitation, tongue and groove, ratchet and gear, indent and detent, latches, etc. as well as snap fit, interference fit, and friction fit mechanisms between the sensor housing and the carrier cavity.

FIG. 13 shows the sensor installed or anchored to the mounting substrate 301. Proximal section 210 is visible from the front. Intermediate section of the sensor 212 is encompassed by the body of the carrier component 320. Distal section 213 of the sensor is also shown covered by the locknut 330. In embodiments, the proximal section of the sensor does not protrude more than 15 mm, preferably not more than 10 mm, and in some embodiments, not more than 13 mm from the front surface of the mounting substrate 301.

In embodiments, the sensor may be removed from the carrier assembly and replaced with another sensor entirely from the front side of the mounting substrate. The sensor is pulled out of the cavity 324 with a force greater than the force of the interlocking grip members. Rear access is not necessary to remove and reinstall a sensor.

Additionally, in embodiments, the sensor includes an electric connector 206, allowing the sensor to be disconnected from the cable, and to reuse the same cable to reconnect a new sensor. Installation does not require any tools. Additionally, because of the geometry and structures described herein, the sensor may be installed/uninstalled in the mounting assembly without applying stress on the tile or the fixture.

ALTERNATIVE EMBODIMENTS

The mounting assemblies and components described herein can interface with a wide variety of ceiling supports and electrical conduit hardware (e.g., ½ in NPSM thread) including conduits, sleeves, fittings, junction boxes, and locknuts. The substrate to which the subject invention is anchored may vary widely. Embodiments of the mounting assemblies described herein can be anchored to various mountable supports, walls, frames, hardware, and allow an individual to install, remove, and reinstall one construction or model of sensor from the front surface of many different types of building substrates.

Although many of the above examples are described for use with sensors, the invention is not necessarily so limited and may include removably supporting or mounting other types of bodies or housings to a substrate. Such bodies may be for purposes other than for sensing environmental factors. In embodiments, the invention does not require a sensor, nor require use with a sensor.

Additionally, the shapes of the carrier and locking member may vary widely and include, for example, non-circular, square, trapezoidal, or other cross sectional shapes in accordance with the invention. The hole in the substrate may likewise vary.

Although a number of embodiments have been disclosed above, it is to be understood that other modifications and variations can be made to the disclosed embodiments without departing from the subject invention.

The invention claimed is:

1. An environment sensor assembly for anchoring an environment sensor to a mounting substrate of a building, the sensor assembly comprising:
   a carrier component comprising a proximal end, a distal end, a body defining a tubular-shaped cavity adapted to removably receive the sensor, and a flange radially extending from the proximal end of the carrier component; and
   a locking component comprising a circular opening;
   wherein the locking component and carrier component comprise interlocking elements adapted to operate together such that the carrier component is configured to be advanced through the opening of the locking component and releasably secured to the locking component; and
   wherein the carrier component comprises a grip structure, the grip structure comprising a spring biased arm and being disposed at the distal end of the carrier component, the grip structure releasably engaging a mating structure on an exterior surface of the sensor and a proximal section of the environment sensor being adjacent to the flange of the carrier component when the sensor is inserted to the carrier component.

2. The environment sensor assembly recited in claim 1, wherein the interlocking elements comprise threads.

3. The environment sensor assembly recited in claim 1, wherein the interlocking elements comprise teeth.

4. The environment sensor assembly recited in claim 1, wherein the flange is spaced from at least one interlocking element by at least 1 inch.

5. The environment sensor assembly recited in claim 1, wherein the flange is spaced from at least one interlocking element by less than or equal to 5 mm.

6. The environment sensor assembly recited in claim 1, wherein the grip structure is adapted to interface with a groove on the sensor housing.

7. The environment sensor assembly recited in claim 1, wherein at least a portion of the interlocking elements of the carrier component is disposed at the distal end of the carrier component.

8. The environment sensor assembly recited in claim 1, further comprising the environment sensor.

9. An environment sensor assembly for anchoring an environment sensor to a mounting substrate of a building, the sensor assembly comprising:
   an environment sensor comprising a proximal section, an intermediate section, a distal section, and a plug connector in the distal section;
   a carrier component comprising a proximal end, a distal end, a body defining a cavity adapted to removably receive the sensor, and a flange radially extending from the proximal end of the carrier component; and
   a locking component comprising an opening adapted to receive the distal end and body of the carrier component and
   wherein the locking component and carrier component comprise interlocking elements adapted to operate together such that the carrier component is configured to be advanced through the opening of the locking component and releasably secured to the locking component and
   wherein the carrier component comprises a grip structure, the grip structure comprising a spring biased arm and being disposed at the distal end of the carrier component, the grip structure engaging a mating structure on an exterior surface of the sensor and the proximal section of the environment sensor being adjacent to the flange of the carrier component when the sensor is inserted to the carrier component.

10. The environment sensor assembly recited in claim 9, wherein the locking component has a ring shape.

11. The environment sensor assembly recited in claim 9, wherein the mating structure on the sensor is a groove.

12. The environment sensor assembly recited in claim 9, wherein the environment sensor is selected from the group consisting of ambient light sensors, temperature sensors, power meters, motion sensors, and infrared sensors.

13. The environment sensor assembly recited in claim 9, wherein the environment sensor is cylindrical shaped.

14. The environment sensor assembly recited in claim 9, wherein the plug connector of the environment sensor is cable-free.

15. The environment sensor assembly recited in claim 9, wherein the body of the carrier component is axially-freely slidable through the opening of the locking component when an interlock of the carrier component is offset from a counter-lock of the locking component.

16. The environment sensor assembly recited in claim 15, wherein the interlock of the carrier component comprises at least one discrete region comprising a plurality of protruding elements.

17. The environment sensor assembly recited in claim 16, wherein the flange is spaced from at least one protruding element of the interlock by less than or equal to 5 mm.

18. The environment sensor assembly recited in claim 16, wherein the discrete region comprises a plurality of teeth.

19. The environment sensor assembly recited in claim 18, wherein the counter-lock of the locking component comprises at least one ratchet which allows for movement in one axial direction across the teeth, and prohibits axial movement in a second direction.

* * * * *